Sept. 1, 1931. A. MILHOMME 1,821,392
MACHINE FOR PRODUCING MOIRÉ FABRICS
Filed April 4, 1930 12 Sheets-Sheet 5

INVENTOR
ALEXANDER MILHOMME
BY
ATTORNEYS

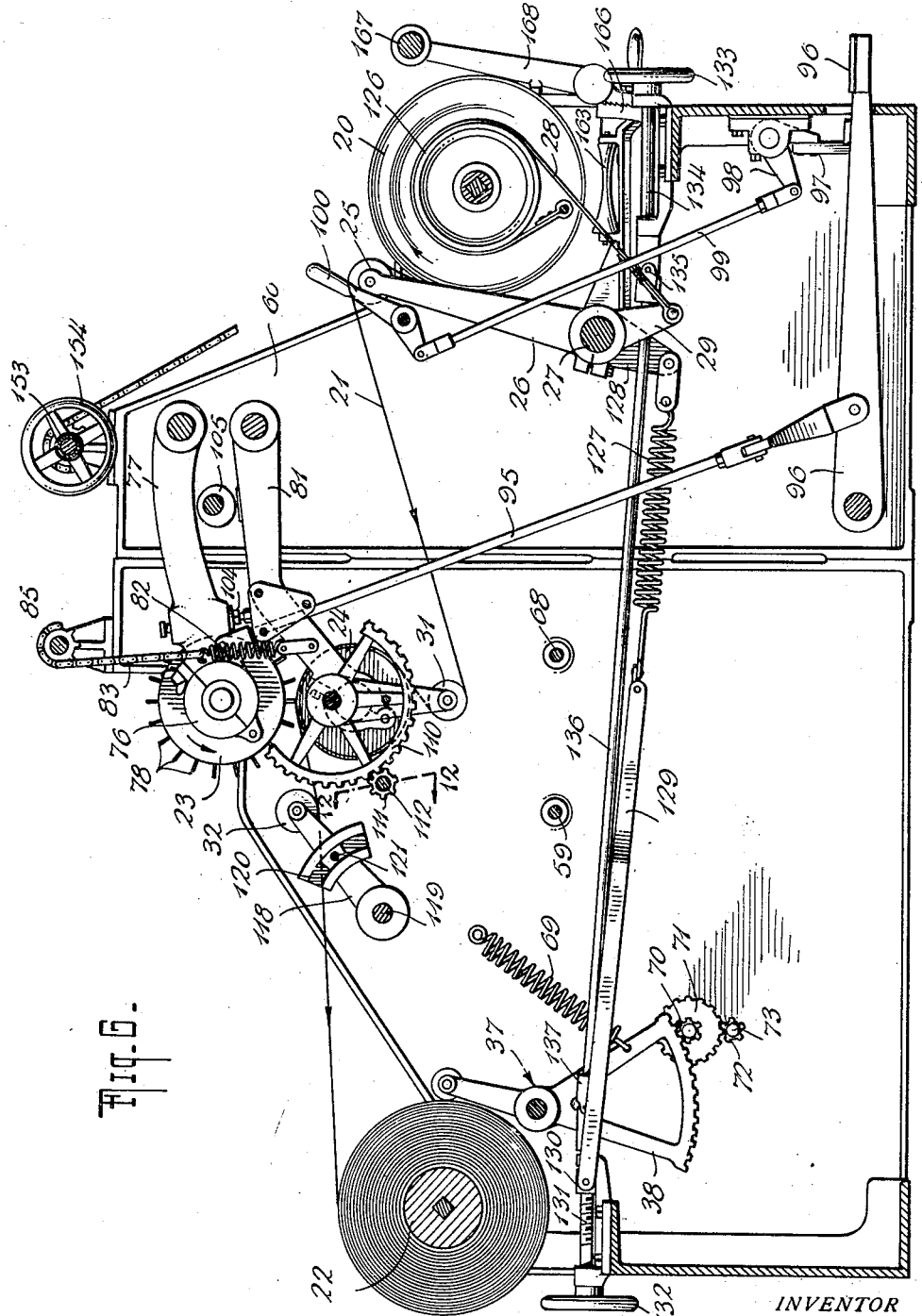

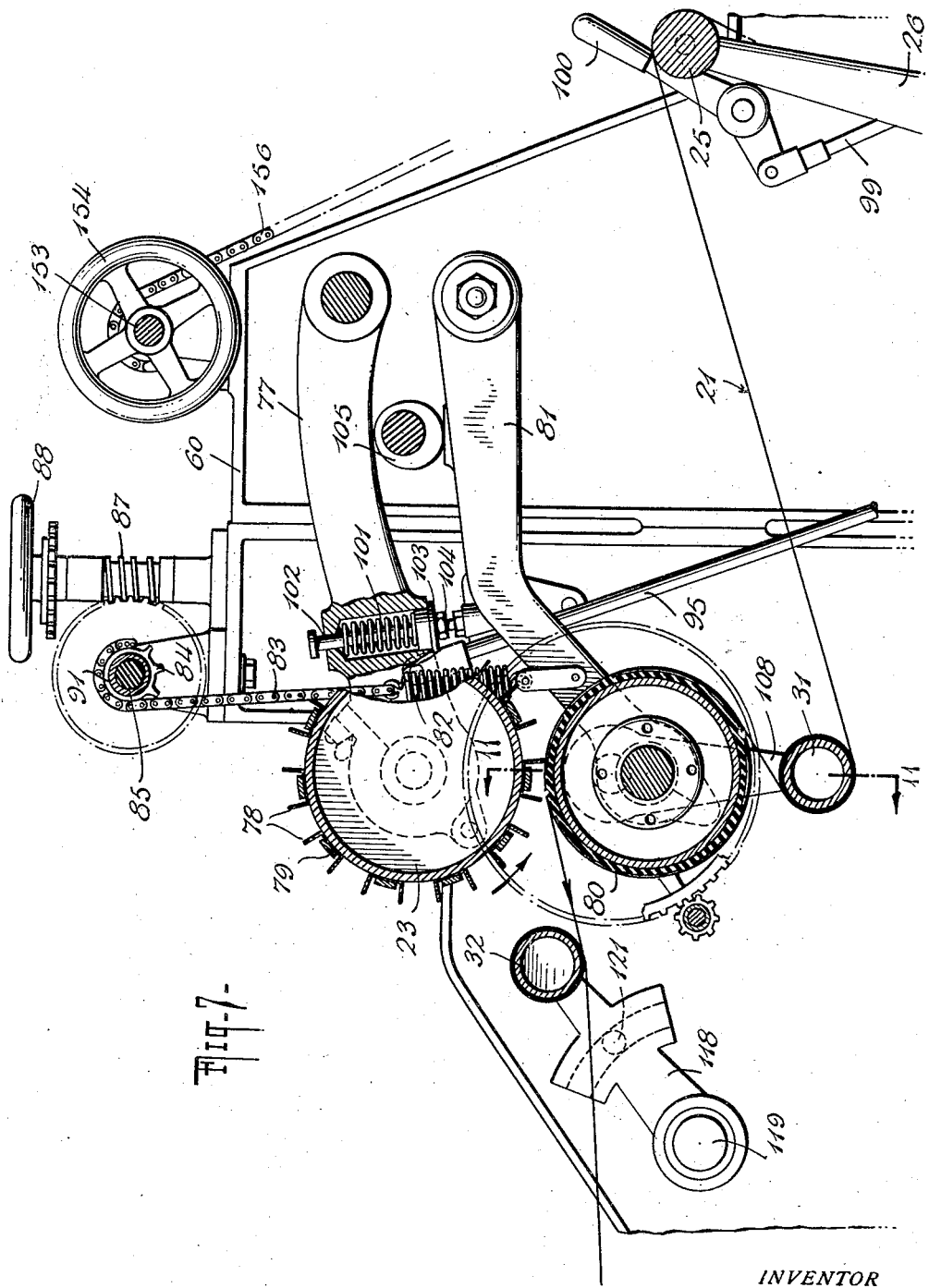

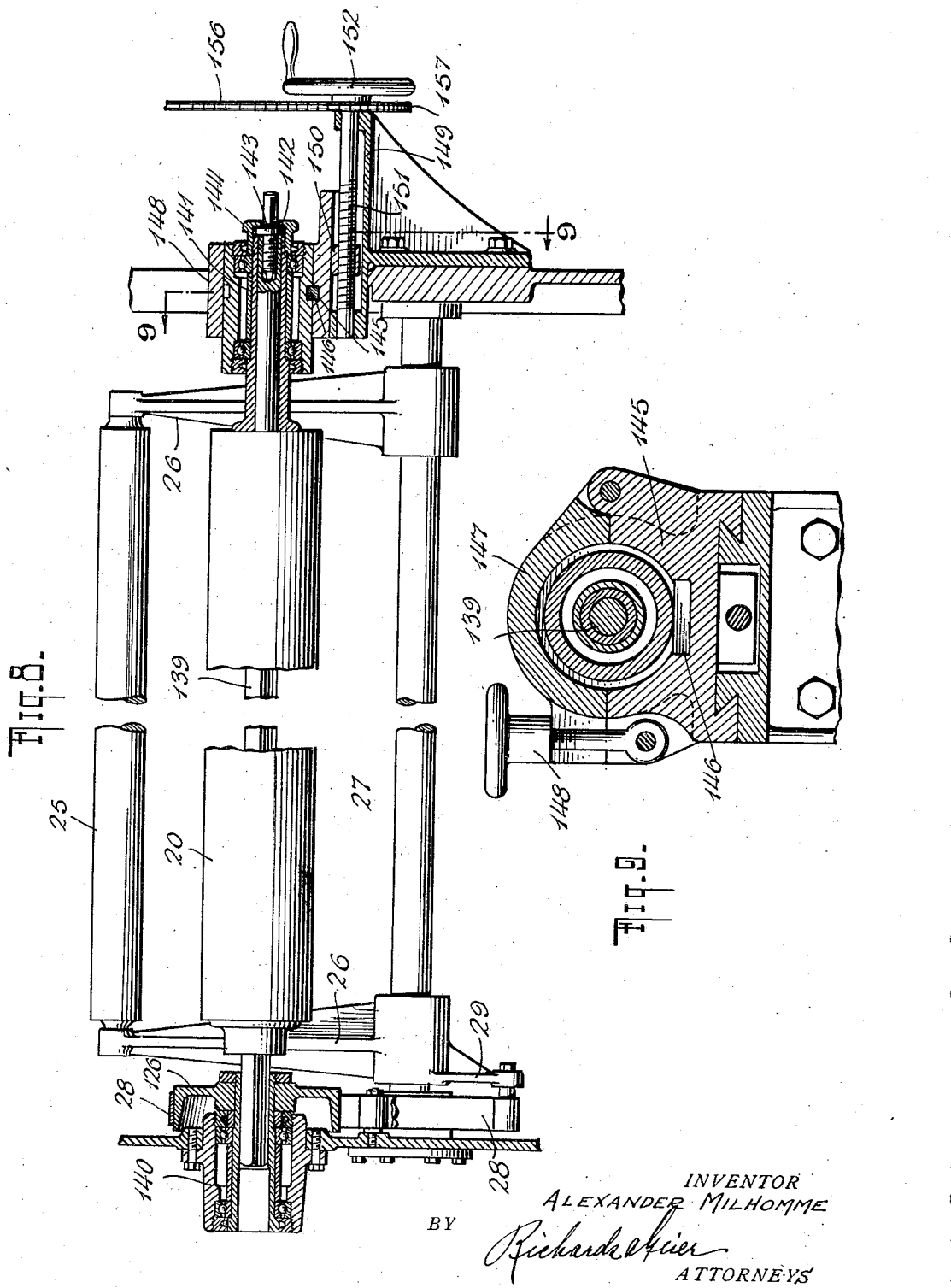

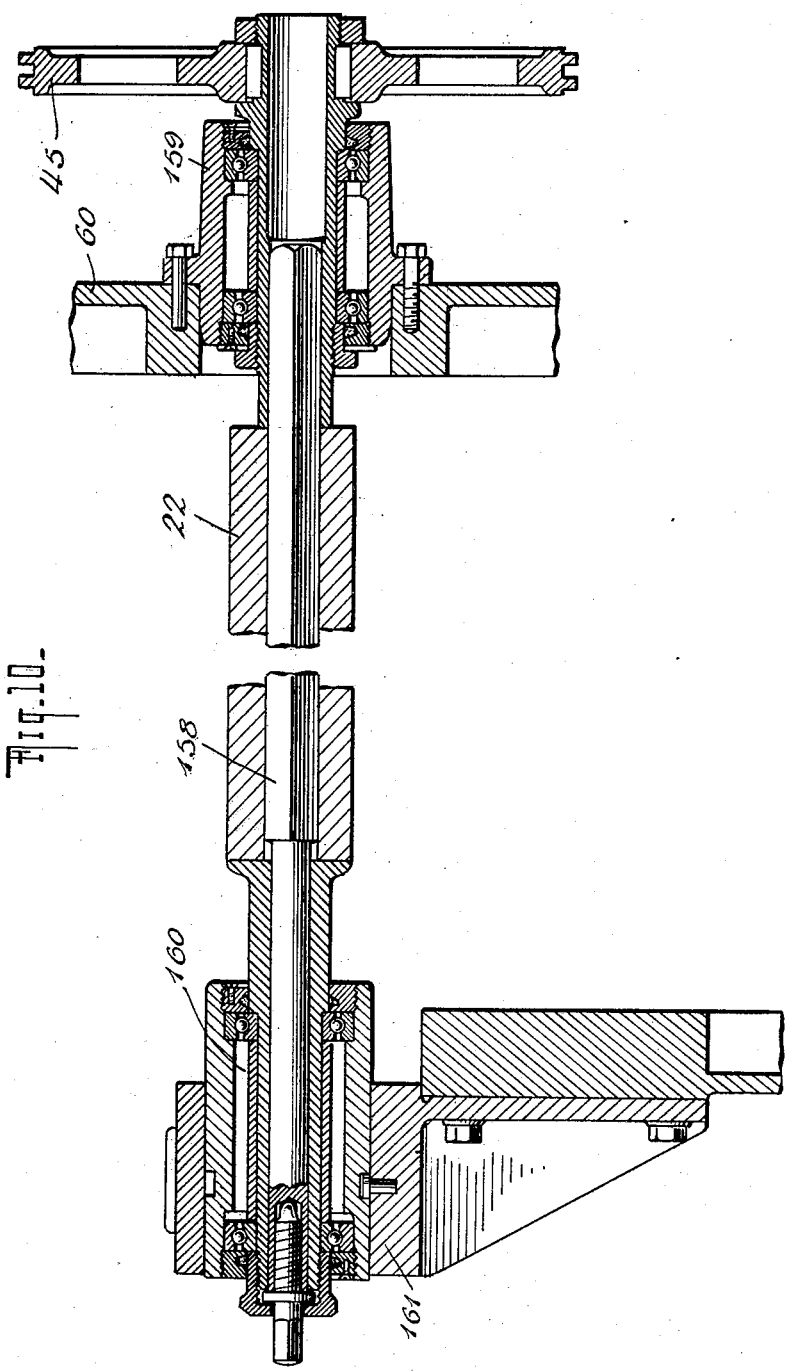

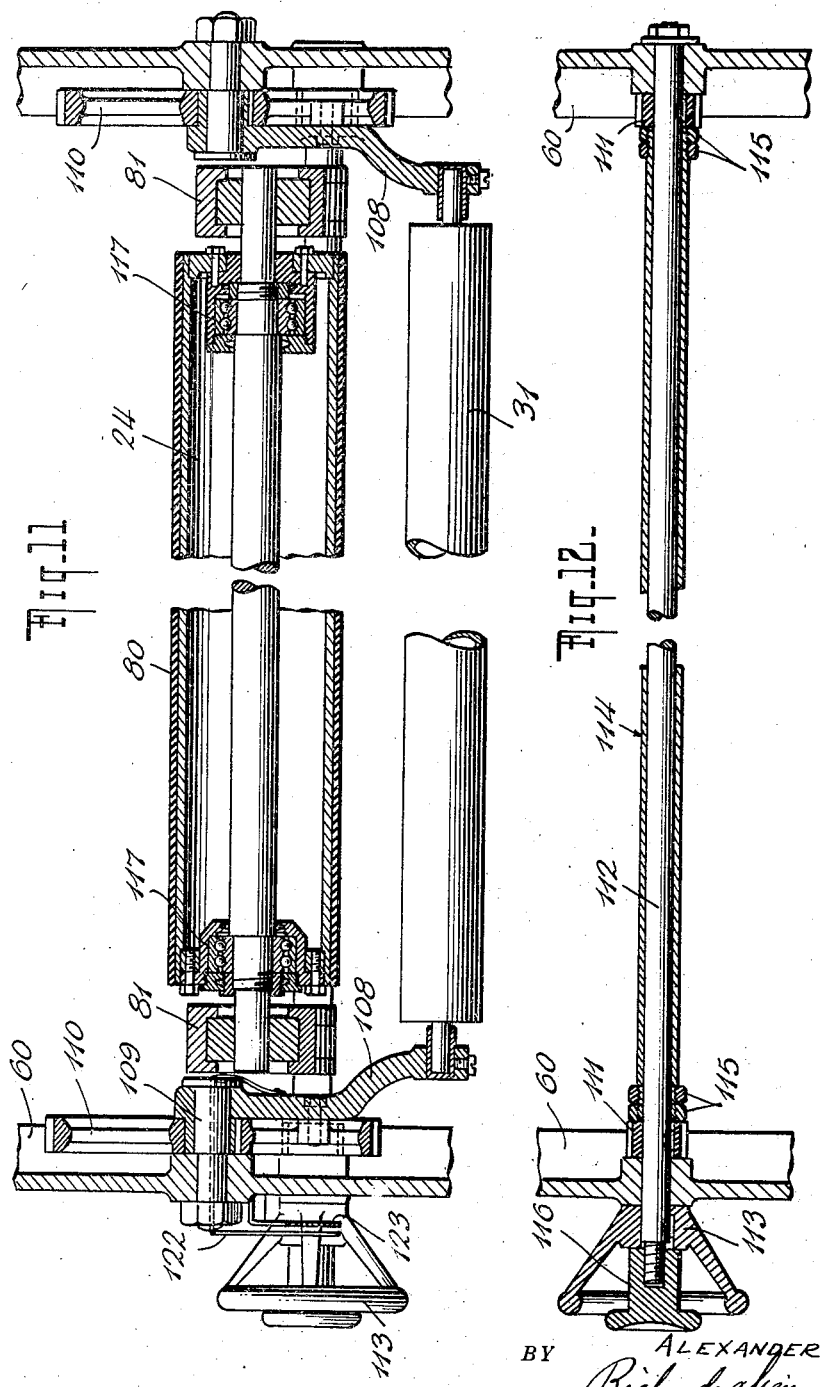

Sept. 1, 1931.  A. MILHOMME  1,821,392
MACHINE FOR PRODUCING MOIRÉ FABRICS
Filed April 4, 1930   12 Sheets-Sheet 11
Fig. 13.
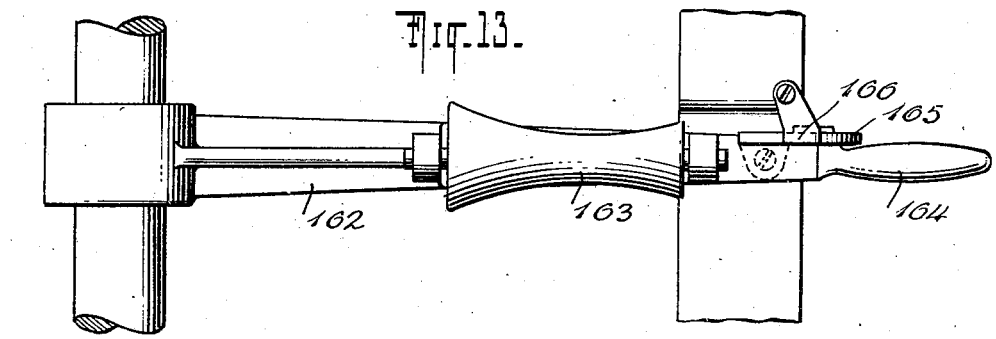
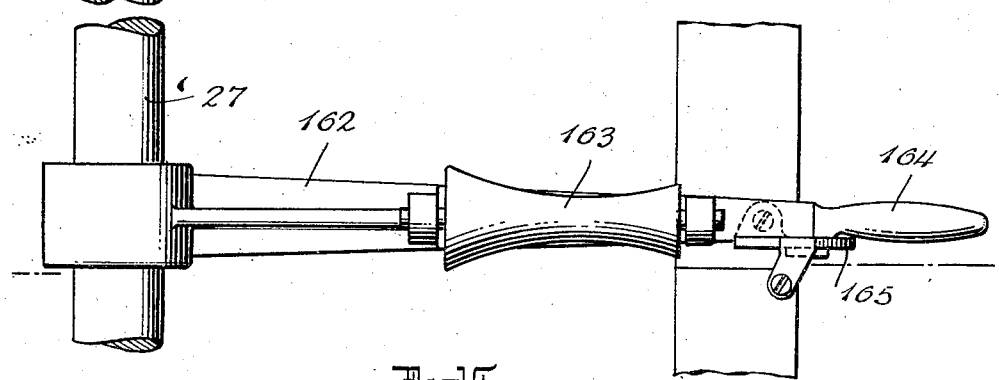
Fig. 14.
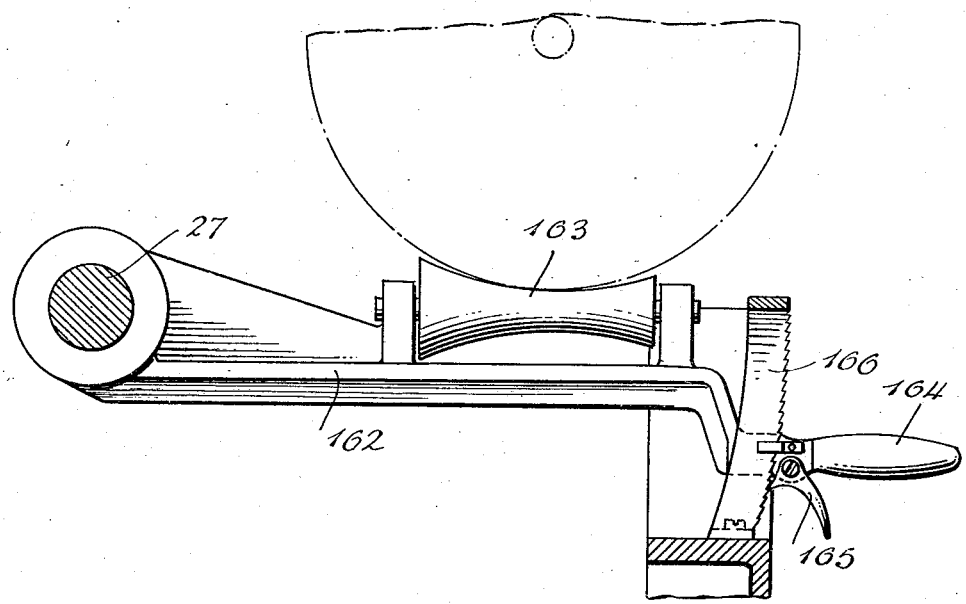
INVENTOR
ALEXANDER MILHOMME
BY
ATTORNEYS Sept. 1, 1931. A. MILHOMME 1,821,392
MACHINE FOR PRODUCING MOIRÉ FABRICS
Filed April 4, 1930 12 Sheets-Sheet 12
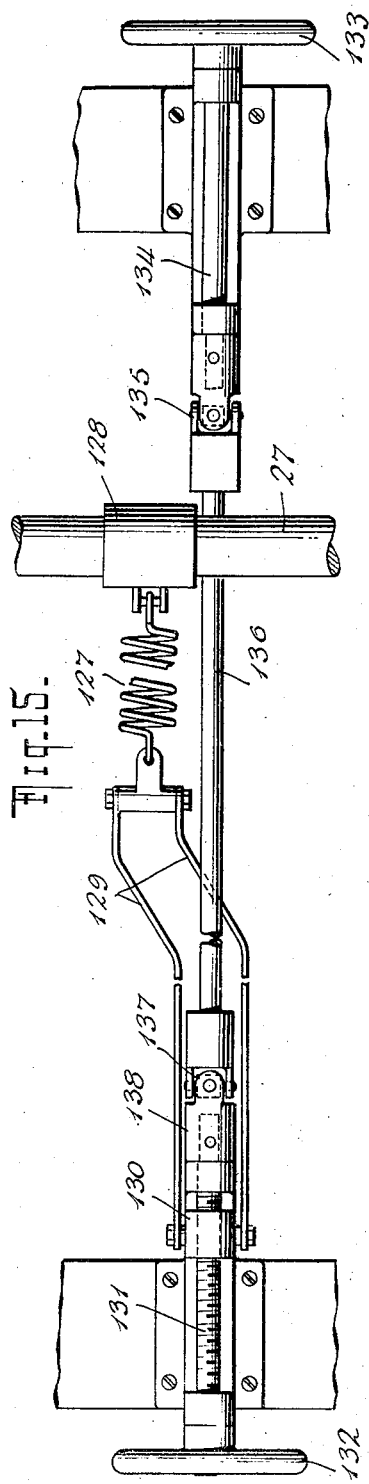
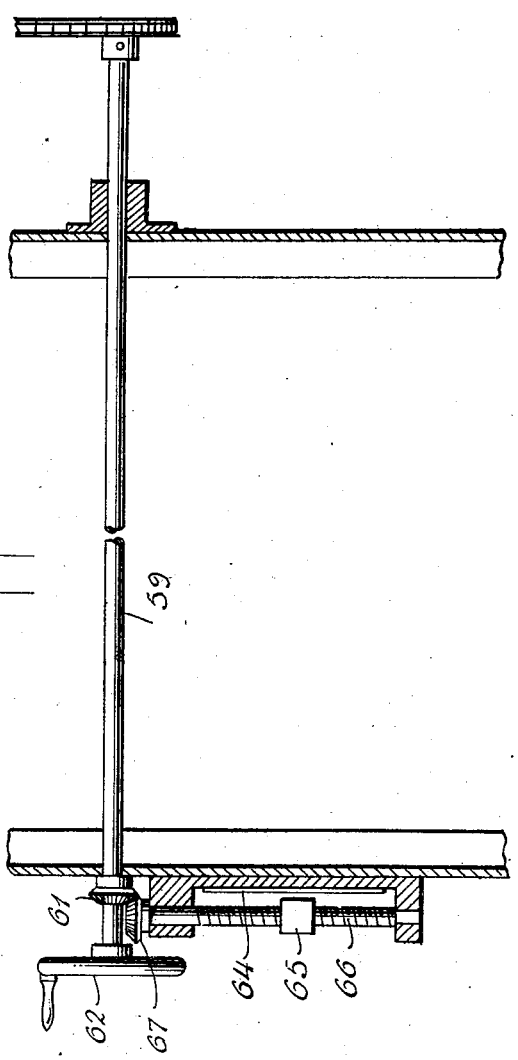
INVENTOR
ALEXANDER MILHOMME
BY
ATTORNEYS Patented Sept. 1, 1931

1,821,392

UNITED STATES PATENT OFFICE

ALEXANDER MILHOMME, OF RIDGEFIELD PARK, NEW JERSEY, ASSIGNOR TO PROGRESSIVE SILK FINISHING CO., OF HOBOKEN, NEW JERSEY, A CORPORATION OF NEW JERSEY

MACHINE FOR PRODUCING MOIRÉ FABRICS

Application filed April 4, 1930. Serial No. 441,566.

This invention relates to improvements in machines for treating textile fabrics, and has particular reference to a machine for producing moiré effects in such fabrics.

An object of the invention is to provide an improved machine wherein the fabric to be treated is passed between pattern and scratching rolls at a constant surface speed so as to produce a uniform pattern on the fabric throughout its length.

Another object is to regulate the speed of rotation of the scratching roll relative to that of the fabric and to control the amount of pressure applied to the fabric by said roll when working with fabrics of different qualities and textures.

A further object is to provide a novel mechanism for adjusting the tension on the fabric as it is being drawn around the pattern roll.

A still further object is to so mount the scratching roll relative to the pattern roll that, when the temporarily connected ends of two lengths of fabric being drawn through the machine are about to be passed between said rolls, the scratching roll may be lifted to avoid contact of the blades thereof with said ends, which contact might otherwise result in injury to said blades or to the fabric due to the additional thickness formed by said ends.

The above and other objects will appear more clearly from the following detailed description, when taken in connection with the accompanying drawings, which illustrate a preferred embodiment of the inventive idea.

In the drawings—

Figure 6 is a section on the line 6—6 of Figure 4;

Figure 7 is an enlarged detailed sectional view of the pattern and scratching roll assembly;

Figure 8 is a longitudinal sectional view of the feed roll mounting;

Figure 9 is a transverse section on the line 9—9 of Figure 8;

Figure 10 is a view similar to Figure 8 of the take-up roll of the machine;

Figure 11 is a longitudinal section on the line 11—11 of Figure 7, taken through the pattern roll and one of the adjustable fabric tensioning rolls associated therewith;

Figure 12 is a similar view on the line 12—12 of Figure 6, showing a locking mechanism for the tensioning roll adjustment;

Figure 13 is a plan view of a feed roll hoisting mechanism employed to mount the roll in position at the forward end of the machine;

Figure 14 is a transverse section through said mechanism;

Figure 15 is a detailed plan view of a part of the brake mechanism for the feed roll; and Figure 16 is a section on the line 16—16 of Figure 2, illustrating the hand adjustment for certain of the variable speed transmissions.

Although the present machine is capable of being used for moiréing fabrics of practically all description which are susceptible to the operation of the scratching roll, the invention is particularly designed for operation upon fabrics made of cellulose acetate, commercially known as celanese.

Figure 1:
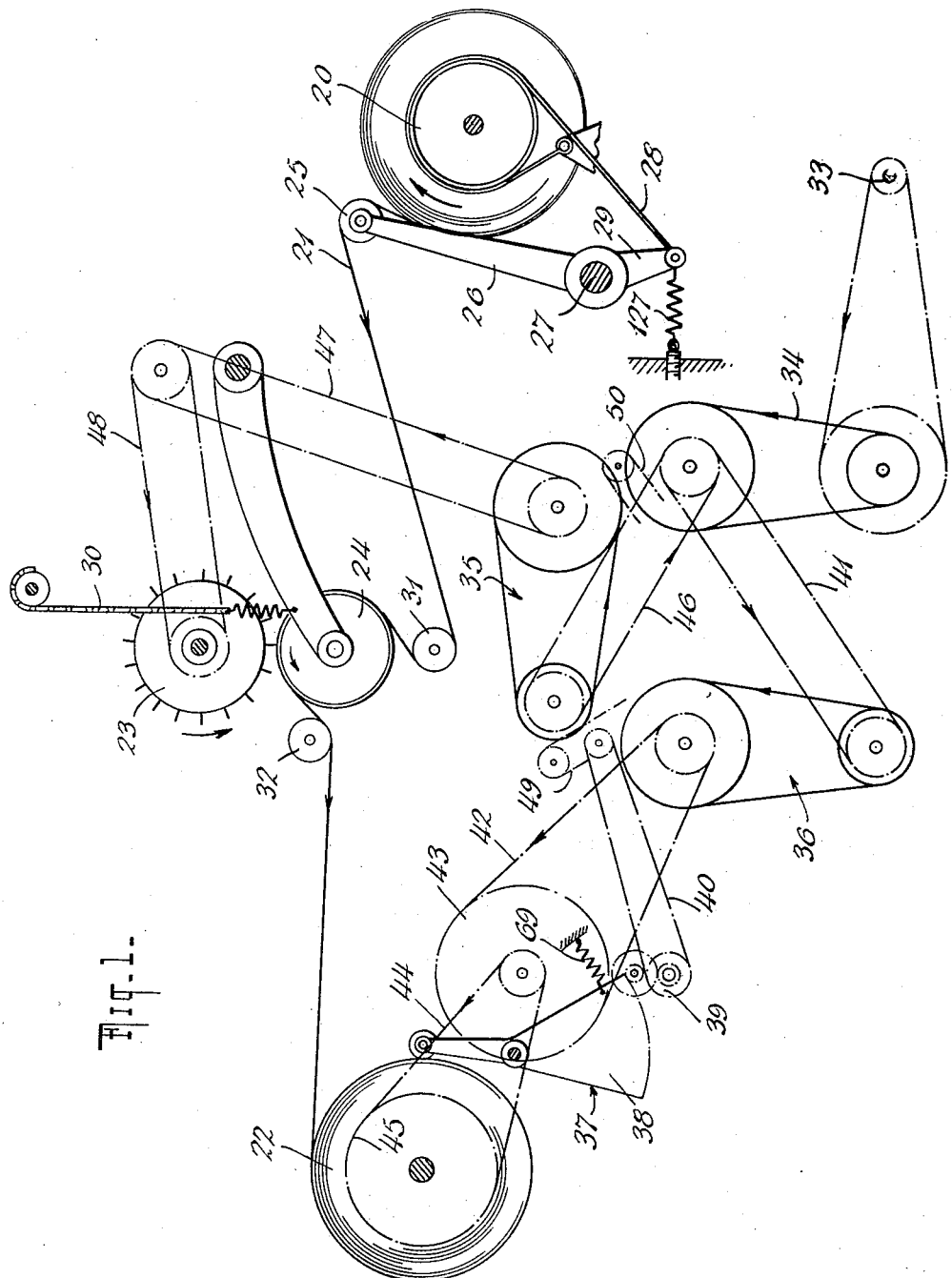
Figure 1 is a fragmentary diagrammatic view of the machine, illustrating some of the essential parts thereof.

By reference to Figure 1, it will be seen that the machine comprises, briefly, the feed roll 20 upon which several lengths of the fabric 21 are adapted to be wound prior to the roll being mounted in position, said lengths having their ends temporarily secured together to form a continuous web while the fabric is being drawn through the machine. As is customary, a length of grey cloth, such as canvas or the like, is secured to the free end of the fabric 21 and led through the machine to the take-up roll 22 at the rear thereof, the length of said cloth being such that the fabric to be treated will not reach the scratching and embossed pattern rolls 23 and 24, respectively, until after the machine has been started and the required adjustments made. From the roll 20 the fabric is led around an idler 25 mounted upon the upper ends of levers 26 supported upon a shaft 27 and forming part of a brake mechanism utilized to stop the rotation of the roll 20 immediately upon cessation of the operation of the machine. This brake mechanism, which will later be described in more detail, further comprises a brake band 28 having one end connected through an arm 29 to one of the levers 26 and its other end secured at a convenient point to the frame of the machine, the intermediate portion acting to frictionally engage a part of the feed roll assembly and bring said roll to a stop when the tension upon the fabric 21 is relieved by the stopping of the driven take-up roll 22 which draws the fabric through the machine. The rolls 23 and 24 are both pivotally mounted and, in order to secure the proper amount of pressure upon the fabric 21 as it passes between said rolls, the pattern roll 24 is held in suspension by an adjustable tensioning mechanism, generally indicated in Figure 1 by the numeral 30 and illustrated in detail in Figure 7. The fabric is passed around idler rolls 31 and 32, associated with the pattern roll 24, and both are adjustable to regulate the tension of the fabric upon the roll 24 as said fabric passes therearound.

The machine is driven by the motor 33 connected to the various driven parts through a plurality of variable speed transmission mechanisms, generally indicated in Figure 1 by the numerals 34, 35 and 36, which are of well-known construction, the two former mechanisms being manually adjustable while the mechanism 36 is automatically controlled by the fabric being wound upon the take-up roll 22 to maintain a uniform surface speed of the fabric as it is passing through the machine. The control for the fabric is such that, as the diameter of the roll of fabric being wound upon the take-up roll increases, the speed of the latter is decreased through a speed-reducing mechanism, generally indicated by the numeral 37 and which includes a toothed segment 38 having one end bearing against the outer layer of fabric upon the roll 22. The other end of the segment is engaged with gearing, generally indicated at 39, which, through the chain 40, controls the adjustments of the transmission mechanism 36. By reference to Figures 1 and 3, it will be seen that this latter mechanism is driven from the mechanism 34 by the chain 41 and, in turn, drives, through the chain 42, the sprocket 43 which rotates the roll 22 by means of the chain 44 and sprocket 45. The mechanism 34 also drives, through a chain 46, the mechanism 35 utilized to control the speed of operation of the scratching roll 23, the latter mechanism transmitting power to said roll through the chains 47 and 48 and being manually adjustable so as to control the speed of rotation of the roll 23 in accordance with the nature of the fabric which is being scratched thereby, said roll rotating in an opposite direction from that of the travel of the fabric. The manual adjustment of the mechanism 35 is accomplished through the chain 49, while that of the mechanism 34 is controlled through the chain 50.

Figure 2:
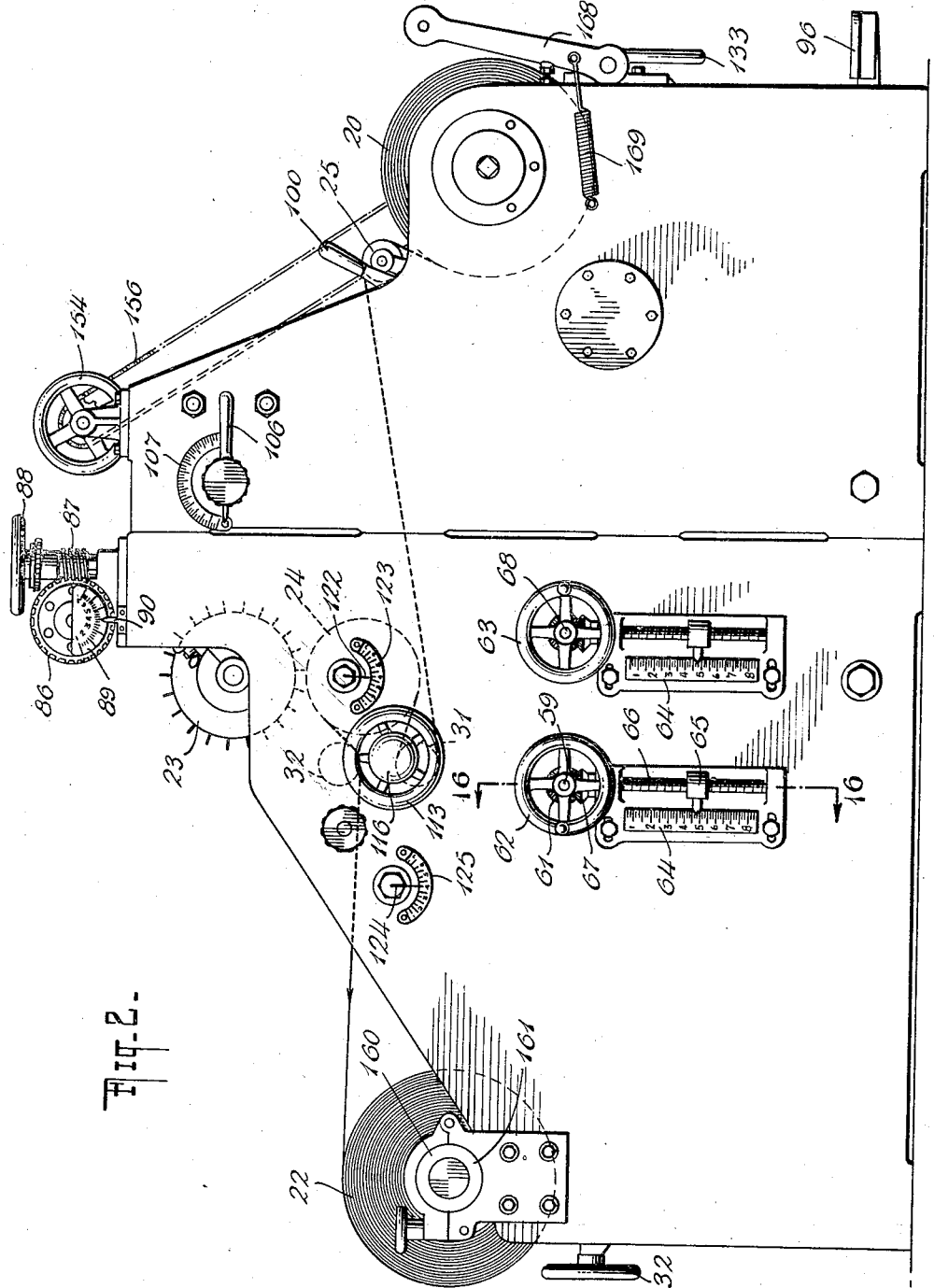
Figure 2 is a side elevation of the machine looking in the same direction as in Figure 1.
Figure 3:
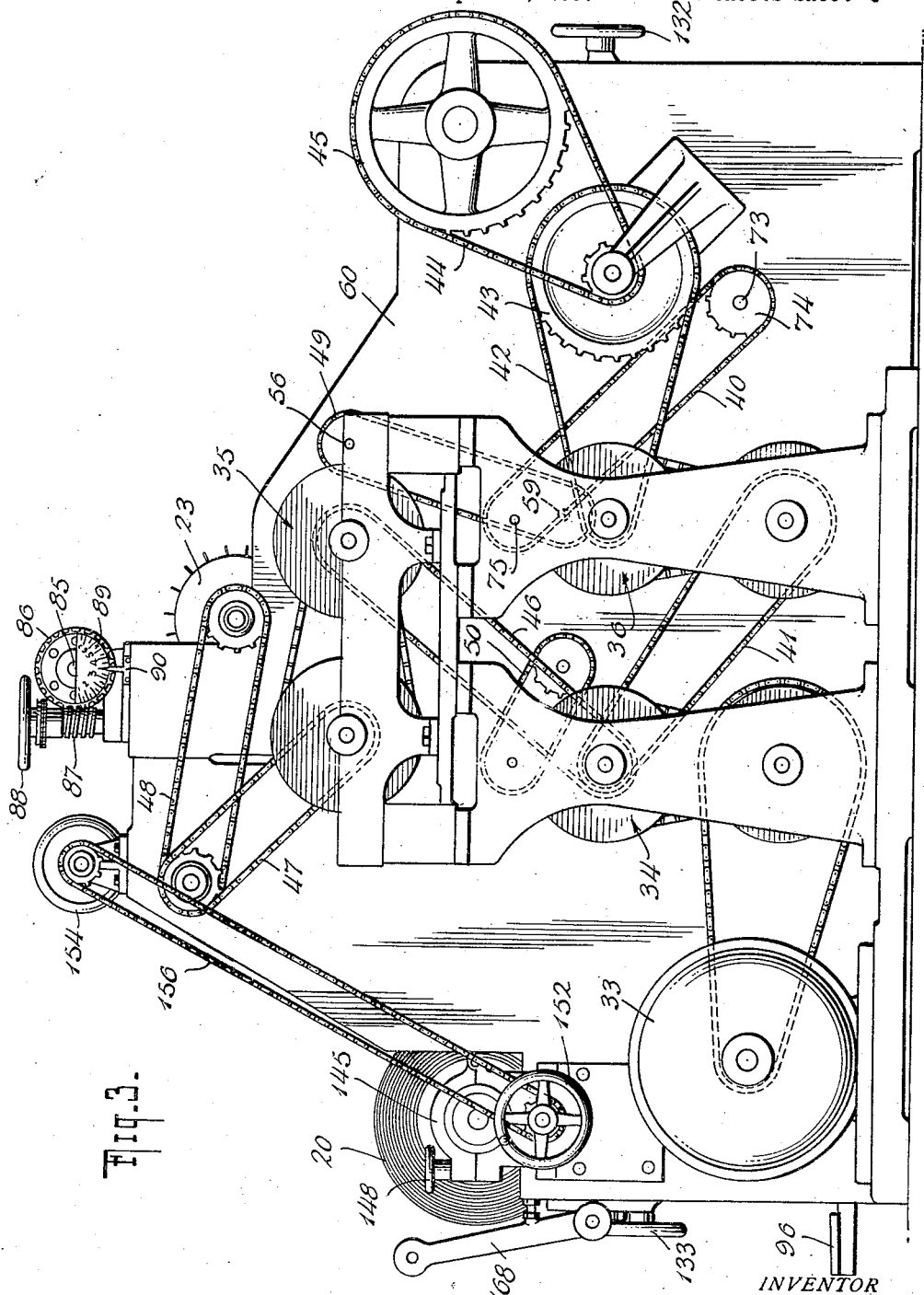
Figure 3 is a side elevation taken from the opposite side of the machine and illustrating various drives, including the variable speed transmission mechanisms employed for controlling the speed of the fabric and that of the rotation of the scratching roll.
Figure 4:
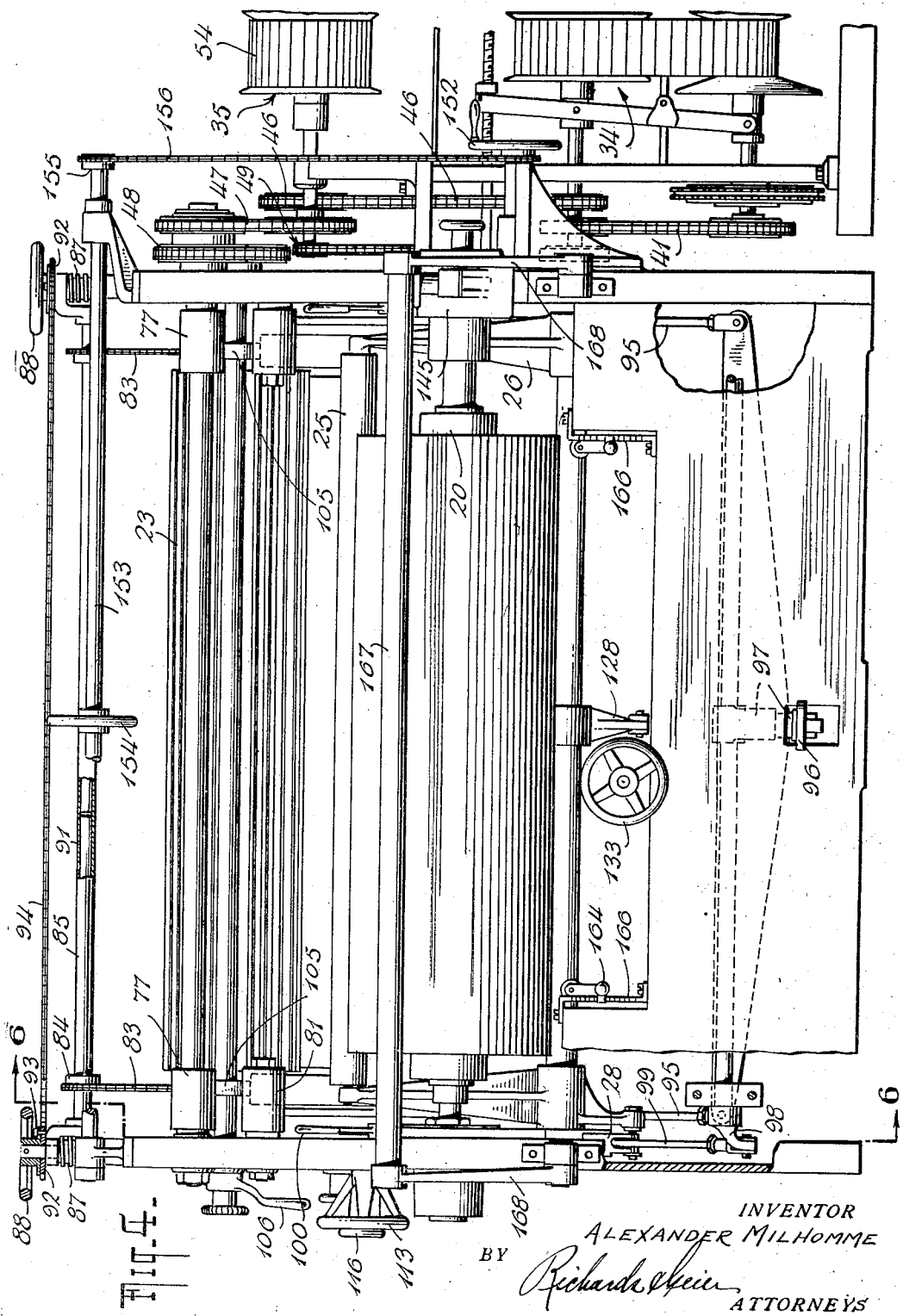
Figure 4 is a front elevation of the machine, partly broken away and shown in section.
Figure 5:
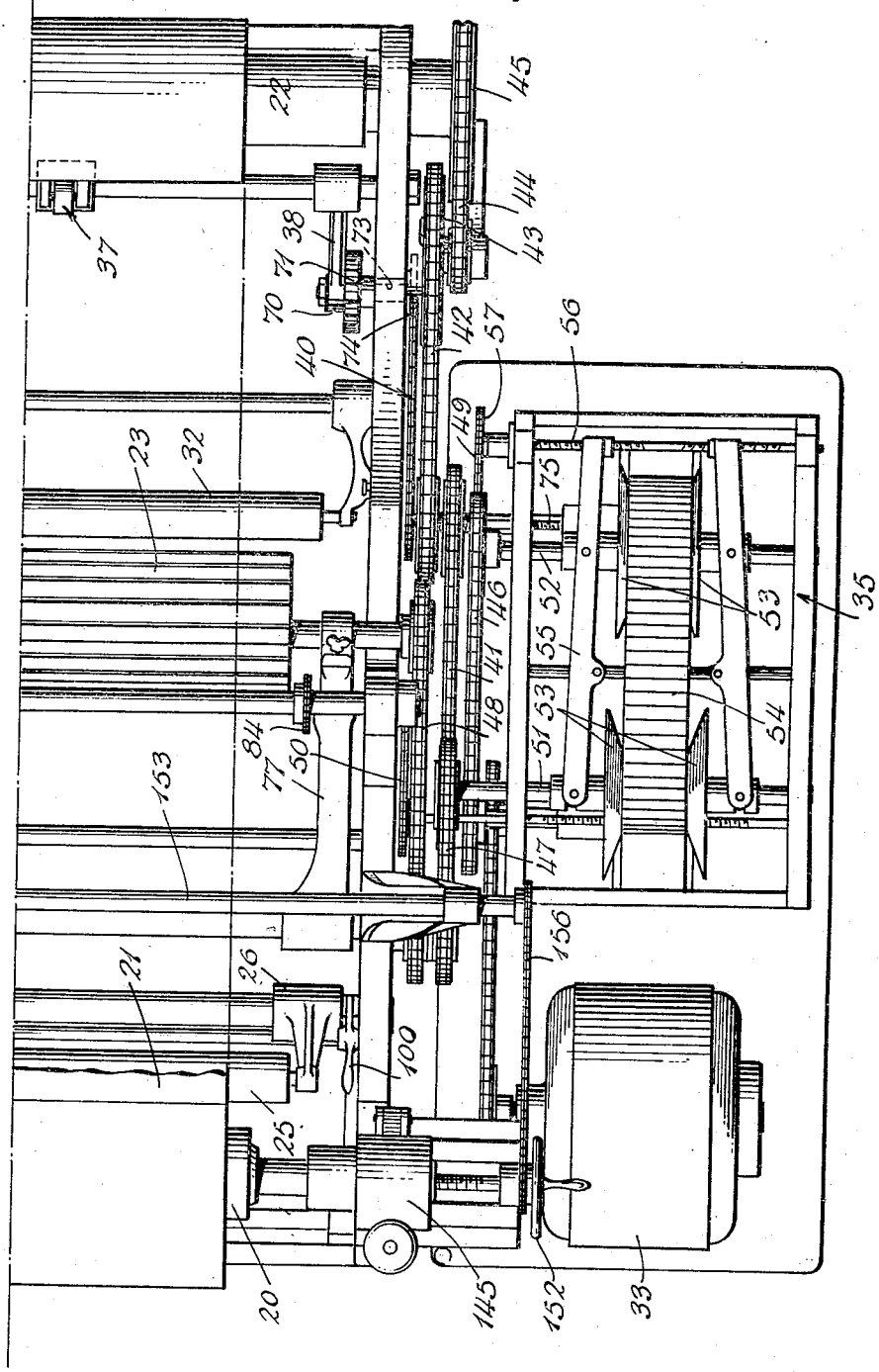
Figure 5 is a fragmentary top plan view principally showing the variable speed transmission controls.

For a brief description of the variable speed control mechanisms, reference is made to Figures 3, 4 and 5 and inasmuch as all of said mechanisms are of like construction, a description of one will suffice. The mechanism which is most clearly shown in Figure 5 is the manually-controlled mechanism 35 which is utilized to govern the speed of the scratching roll 23. Said mechanism comprises a framework in which shafts 51 and 52 are supported, each shaft carrying the separable sections or disks 53 of a pulley about which the drive element 54 extends. The sections of each pulley are adjustable toward and away from each other in order to vary the effective diameter thereof and this is accomplished through levers 55 fulcrumed intermediate their ends and engaged at adjacent ends by the opposed screw threads of a rod 56. This rod carries a sprocket 57 at one end which is engaged by the chain 49, the latter also engaging a sprocket 58 (Figure 16) mounted upon one end of a shaft 59 extending through the frame 60 of the machine. The other end of said shaft carries a bevel gear 61 and a hand-wheel 62 (Figure 2). It will thus be seen that as the wheel 62 is turned rotation will be imparted to the rod 56 through the chain 49, thus turning said rod to vary the distance between the ends of the levers 55, resulting in adjustments of the disk sections 53 of the two pulleys and thereby varying the driving speed. In connection with the hand adjustment of the mechanism 35 and also that of the mechanism 34, the latter of which is accomplished through a hand-wheel 63 (Figure 2) and associated mechanism similar to that described in connection with the wheel 62, it is desirable, after a certain setting of said mechanisms has been effected for a particular kind of fabric, that a record be made of this setting. For this purpose, a graduated scale 64 is associated with each of the hand-wheels and movable along this scale is a pointer 65 mounted upon a screw shaft 66, the upper end of which carries a bevel gear 67 meshing with the gear 61 so that as the shaft 59 is rotated the pointer 65 will be adjusted along the shaft 66. When the proper adjustment has been made the reading on the scale 64 may be recorded so that the same setting for the transmission mechanism 35 may be accomplished when the machine is subsequently used for said particular kind of fabric. Likewise, a reading may be taken of the fabric speed control from the scale 64 associated with the hand-wheel 63 which is mounted upon one end of a shaft 68 similar to the shaft 59, which is associated with the variable speed mechanism 34.

Referring again to the automatic control of the mechanism 36, which is under the influence of the speed-reducing mechanism 37, it will be seen, by reference to Figure 6, that the upper end of the toothed segment 38 is held against the fabric on the roll 22 by the action of a spring 69 and that, as the diameter of the roll of fabric increases, said segment is turned in a clockwise direction, thereby rotating the pinion 70 and gear 71 in an opposite direction. Engaged with said gear is another pinion 72 mounted upon the shaft 73 which also carries a sprocket 74 (Figure 3) engaged by the chain 40. Thus, the turning movement of the segment 38 under the control of the roll of fabric is transmitted to the chain 40 to rotate the screw-threaded rod 75 (Figure 5), similar to the rod 56, of the transmission mechanism 36, thereby effecting a continuous adjustment of the pulleys of said mechanism as the diameter of the fabric on the roll 22 increases and, in this manner, maintaining a constant speed of the fabric through the machine.

The scratching and pattern rolls 23 and 24 will now be described in detail (see Figure 7). The roll 23 has its ends supported in the bearings 76 of two pivotally mounted hanger arms 77 and comprises a cylinder upon the periphery of which are mounted a plurality of longitudinally extending scratching blades 78 each formed from a substantially U-shaped strip of metal, such as brass, with the intermediate portion of each strip removably secured to the periphery of the roll by a slat 79. The pattern roll 24, which is provided with an embossed rubber covering 80, is suspended in cooperative relation with the scratching roll by means of hanger arms 81 pivotally mounted on the frame of the machine. The suspension for said roll 24 is such that the same will exert a constant upward pressure against the blades of the scratching roll, which pressure may be varied in accordance with the particular kind of fabric being treated. To this end, each arm 80 has connected thereto a coil spring 82 to which is joined a chain 83 extending upwardly and over a sprocket 84 carried by a shaft 85 mounted upon the top of the frame 60, this being the mechanism generally indicated by the numeral 30 in Figure 1. The shaft 85 also carries a worm gear 86 adjacent each end meshing with the worm 87 which has a hand-wheel 88 adapted to be turned to transmit motion to the shaft 85 whereby the chain 83 may be raised or lowered to vary the tension of the spring 82. In order that a permanent record may be made of the tension required for any particular kind of fabric, each worm gear 86 carries a graduated dial 89 with which is associated a pointer 90. The construction of this adjusting mechanism is such that an operation of either hand-wheel 88 may accomplish the unitary adjustment of the chains 83, or each end of the pattern roll may be elevated or lowered independent of the other end. For this purpose, the shaft 85 is split into two sections (see Figure 4) intermediate its ends and a sleeve 91 encircles the adjacent ends so that the two sections of the shaft may, if desired, be turned independently by the associated hand-wheel 88. Each worm shaft 87 carries a sprocket 92 to which the handwheel is detachably connected by a removable pin 93. Connecting the sprockets 92 is an endless chain or other flexible element 94 and when the pins 93 are in place a turning of either wheel 88 will cause the worm of the other wheel also to be rotated, thus producing simultaneous adjustment of both ends of the pattern roll through the two chains 83. However, should it be desired to make an adjustment of one end of the pattern roll independent of the other, the pin 93 of the hand-wheel associated with the end which is to be adjusted is removed from engagement with the sprocket 92 so that rotation of said hand-wheel will only be imparted to the adjacent chain 83, a section of the shaft 85 connected to said hand-wheel being turned to the exclusion of the other section of said shaft.

Returning now to the scratching roll 23, provision is made for temporarily moving the roll away from the pattern roll while the joined ends of two lengths of fabric are passing between said rolls, thereby to avoid contact of the blades 78 with the fabric during this interval. The roll 23 is held down in cooperative relation with the fabric and pattern roll by a mechanism which consists of links 95 each connected at one end to one of the arms 77 and at its other end to a treadle 96 (Figure 6) pivotally mounted in the frame 60 and extending through the front end thereof. This treadle is held down in its operative position, as shown, by a latch 97 carried by a bell-crank 98. A rod 99 connects said bell-crank to an operating lever 100 at the front of the machine by means of which the operator may swing the latch 97 inwardly and disengage the same from the treadle 96. As the operator observes the joined ends of the two lengths of fabric approaching the rolls 23 and 24, he releases the treadle in the manner described to permit of the upward movement of the roll 23 away from the pattern roll. This movement is accomplished by means of a coil spring 101 (Figure 7) enclosed in each arm 77 and compressed when the roll 23 is in its operative position. Said spring encircles a plunger 102, the lower end of which is provided with a flange 103 engaging said arm 77, so that the downward movement of the latter, when adjusting the roll 23 to operative position, compresses said spring. The flange 103 engages an adjustable abutment 104 carried by the frame of the machine to limit the downward movement of said roll 23. When the treadle 96 is released, as described, the compressed spring 101 in each arm 77 expands and forces the arm upwardly with the result that the scratching roll is raised away from the pattern roll and the joined ends of the fabric are free to pass beneath the roll 23 without being touched by the blades 78. As soon as the operator observes that the joined ends of the fabric have passed beyond the rolls, he again depresses the treadle 96 to move the roll 23 downwardly to its operative position and throws the lever 100 to latch said treadle in its depressed position. It is desirable in connection with the operation of the scratching and pattern rolls that the upward movement of the latter roll, under the influence of the spring 82, be limited so that under no circumstances will there be too much pressure exerted against the blades of the scratching roll. To this end, there is mounted between the arms 77 and 81 of the two rolls a cam 105 which is normally spaced a slight distance from the arms 81, but which will act as a stop limiting the upward movements of said arms if the pull exerted by the springs 82 becomes excessive. As the blades 78 of the scratching roll and the surface of the embossed covering 80 of the pattern roll wear down after constant use, it is necessary, of course, to extend the limit of upward movement of the pattern roll and, in order to accomplish this, the cam 105 may be turned slightly by means of a lever 106 (Figure 2) carried by one end of the shaft upon which said cam 105 is mounted, said lever carrying a pointer movable over a graduated, scale 107 which enables a record to be made of the position of said cam.

It is further desirable to regulate the tension of the fabric as it passes around the pattern roll by causing more or less of said fabric to frictionally engage said roll. It is for this purpose that the two idlers 31 and 32 are provided. Referring to Figure 11, it will be seen that the roll 31 is suspended below the pattern roll by means of two arms 108 pivotally supported in the frame 60 of the machine by the trunnions 109. To the upper or pivotal end of each arm 108 there is keyed a gear wheel 110 (see also Figure 6) with which meshes a pinion 111 mounted upon a shaft 112 extending across the frame and having a hand-wheel 113 keyed to one end exteriorly of the frame. The shaft 112 and its hand-wheel are utilized for the purpose of securing the idler roll 31 and its supporting arms 108 in various positions of circumferential adjustment relative to the pattern roll and, to this end, there is mounted upon the shaft 112 between the pinions 111 a sleeve 114 screw threaded at each end to receive adjusting nuts 115 utilized to vary the effective length of the sleeve relative to the distance between the two pinions 111. The shaft 112 has threaded upon one end thereof a binding nut 116 adapted to engage and lock the hand-wheel 113 in adjusted position. By screwing the nut 116 against the wheel, pressure is exerted against both sides of the frame 60 through the shaft 112 and this pressure will bind the pinions 111 against the adjacent ends of the sleeve 114, thereby preventing turning of the pinions until such time when the nut 116 is released, whereupon the wheel 113 may be turned to adjust the arms 108 through the medium of the gears 110. The pattern roll 24 is provided at each end with a ball bearing mounting 117 of any approved construction which will permit of the roll itself being removed and replaced whenever desired. The other idler 32 is carried by supporting arms 118 (Figure 6) mounted upon a shaft 119 and each having a portion movable in an arcuate guide 120 and secured in said guide by a binding screw or other fastener 121.

To record adjustments of the idler roll 31, one of the arms 108 may have one end of a wire 122 secured thereto, an intermediate portion of said wire extending through the adjacent trunnion 109 with the outer end of the wire forming a pointer movable over a dial 123. In like manner, a pointer 124 may be mounted upon the axis of rotation of one of the arms 118 so as to be movable over a dial 125 so that a record may also be made of adjustments of the idler roll 32.

The braking mechanism for the feed roll 20 will now be described in more detail. As previously set forth, this mechanism includes a brake band 28 connected to one of the levers 26. While the fabric 21 is running through the machine a pull is exerted upon the upper end of the idler 25 which consequently relieves the tension of the band 28 against a drum 126 (Figure 8) which is rotatable with the roll 20. Should the machine be stopped for any reason, the pull upon the fabric 21 is relieved and a tensioned coil spring 127 then becomes effective to rock the shaft 27 so as to cause the band 28 to grip the drum 126 and thereby bring the roll 20 to a stop without allowing any slackening of the fabric between said roll and the pattern roll 24. To accomplish this, the spring 127 is connected at one end to an arm 128 depending from the shaft 27, while its other end is connected to the links 129 (Figure 15). The ends of said links remote from the spring 127 carry a follower nut 130 internally screw threaded to receive the screw 131 carrying a hand-wheel 132 and mounted in the rear of the frame of the machine. From the rear of the machine the operator may turn the wheel 132 and thereby cause the follower nut 130 to move along the screw 131 with the result that the tension of the spring 127 may be adjusted to the proper degree. This same adjustment may be accomplished from the forward end of the machine by means of a hand-wheel 133 carrying a stem 134 to the inner end of which is connected, by means of a universal joint 135, a rod 136, the opposite end of which is joined to a second universal joint 137, the section 138 of which receives the inner end of the screw 131. Thus, by turning the wheel 133 from the front end of the machine, the screw 131, which is keyed to the section 138, may be turned to produce the same result as described in connection with the turning of the wheel 132.

Referring now in detail to the mounting of the feed roll 20 (Figure 8), the ends of the shaft 139 of said roll are supported in roller bearings, generally indicated by the numerals 140 and 141, the former of which is secured to the frame of the machine and adapted to receive the square end of said shaft. When mounting the roll 20 in position the same is elevated, in a manner to later appear, to align with the bearings 140 and 141 and the shaft 139 is then inserted through the bearing 140, the roll 20 and then into the bearing 141. Then, in order to lock the shaft 139 in position and prevent longitudinal movement thereof in said bearings, the bearing 141 is provided with a screw member 142 having a flange 143 against which a portion of the bearing and the adjacent end of the shaft abut, the inner end of said screw member engaging the end of the recess in the shaft in which it is mounted. After being turned to properly position the shaft, said screw member 142 is retained in adjusted position by means of the nut 144 which also engages the flange 143.

The bearing 141 is mounted within a sectional bearing bracket 145 and keyed thereto at 146, the upper section 147 of said bracket being held in operative position by means of the pivoted lock 148.

It sometimes becomes necessary, at the beginning of the operation of a run of fabric through the machine, to shift said fabric longitudinally of the pattern roll in order to secure proper registry with the embossed surface of the latter, and this is accomplished by a lateral shifting of the feed roll 20 in its bearings. For this purpose, the bearing bracket 145 is mounted to slide upon a support 149, shown at the right of Figure 8, and has a follower 150 depending therefrom engaged by a screw 151 rotatable in said support and having a hand-wheel 152 at its outer end. It will thus be seen that, when the wheel 152 is turned, the bearing bracket and consequently the bearing 141 which is keyed thereto will be shifted laterally and carry the roll 20 therewith. The wheel 152 is located at one side of the machine and, in order to make the described adjustment from the front of the machine, there is provided an additional mechanism for turning said wheel. This mechanism comprises a shaft 153 (Figure 4) extending across the top of the machine and provided intermediate its ends with a hand-wheel 154. At one end of the shaft the same carries a sprocket 155 engaged by a chain 156 which is also extended around a sprocket 157 carried by the hand-wheel 152. Thus, by turning the wheel 154 from a position in front of the machine, it will be apparent that this movement will be transmitted to the wheel 152 to secure the desired adjustment of the roll 20.

In Figure 10, the details of the mounting of the take-up roll 22 are shown. The shaft 158 of said roll is insertable through the fixed roller bearing assembly 159 with the square end of the shaft disposed therein when in position, while the other end of said shaft carries the bearing assembly 160, similar in construction to the bearing 141 of the feed roll 20 and also keyed in a sectional bearing bracket 161 from which the bearing, together with the shaft 158 and roll 22, may be disengaged when demounting the take-up roll at the conclusion of the run of the fabric through the machine.

Referring now to Figures 13 and 14, there is shown a hoisting mechanism for lifting the feed roll 20, with a roll of fabric thereon, into aligned position with the bearings 140 and 141 preparatory to the insertion of the shaft 139 of said roll through the same. This mechanism is located at the front end of the machine and comprises two pivotally mounted supporting members or arms 162, each of which carries a roller 163 having a concave surface adapted to support the roll of fabric. The outer or forward ends of the arms 162 terminate in handles 164 adapted to be grasped by the operator or operators and lifted to elevate the roll of fabric to a position where the roll 20 is aligned with the bearing 140 so as to receive the shaft 139. In order to hold the arms 162 in adjusted position, the same carry latching pawls 165 adapted to engage the arcuate racks 166. After the roll of fabric has been properly aligned and mounted in place, the supporting arms 162 may be lowered to disengage the rollers 163 from said roll.

For the protection of the operator, at the front of the machine there is provided a guard rail 167 extending across the machine and supported by pivoted arms 168 connected to the frame by a spring 169 which yieldably holds the guard rail in an elevated position.

What is claimed is:

1. In a machine for treating fabrics, feed and take-up rolls, means to treat a fabric as it is fed from the feed to the take-up roll, a variable speed transmission mechanism for driving said means, a second variable speed transmission mechanism for driving said take-up roll, means actuated as the diameter of the roll of fabric increases on said take-up roll for controlling the speed of said second mechanism, and means common to said variable speed transmission mechanisms for driving the same.

2. In a machine for treating fabrics, feed and take-up rolls, means to treat a fabric as it is fed from the feed to the take-up roll, a variable speed transmission mechanism for driving said means, a second variable speed transmission mechanism for driving said take-up roll, means actuated in accordance with variations in the diameter of the roll of fabric on said take-up roll for controlling the speed of said second mechanism, and a third variable speed transmission mechanism for operating the first two named mechanisms.

3. In a machine for treating fabrics, feed and take-up rolls, means to treat a fabric as it is fed from the feed to the take-up roll, a variable speed transmission mechanism driving said take-up roll, a manually adjustable variable speed transmission mechanism for driving said treating means, a second manually adjustable variable speed transmission mechanism for operating the first two named variable speed transmission mechanisms, and means actuated by variations in the diameter of the roll of fabric on said take-up roll for controlling the speed of the first-named variable speed transmission mechanism.

4. In a machine for treating fabrics, feed and take-up rolls, means to treat a fabric as it is fed from the feed to the take-up roll, a variable speed transmission mechanism for driving said take-up roll, a manually controlled variable speed transmission mechanism for driving said means, another manually controlled variable speed transmission mechanism for operating the two other mechanisms, and means automatically controlling the speed of the first named mechanism in accordance with the varying diameter of the roll of fabric on said take-up roll.

5. In a machine for moiréing fabrics, scratching and pattern rolls between which a fabric is passed to produce moiré effects thereon, a resilient suspension for said pattern roll causing the same to exert pressure in the direction of said scratching roll, and means to adjust said suspension to vary said pressure.

6. In a machine for moiréing fabrics, scratching and pattern rolls between which a fabric is passed to produce moiré effects thereon, a resilient suspension for said pattern roll causing the same to exert pressure in the direction of said scratching roll, means to adjust said suspension to vary said pressure, and adjustable means for limiting the movement of said pattern roll toward said scratching roll.

7. In a machine for moiréing fabrics, scratching and pattern rolls between which a fabric is passed to produce moiré effects thereon, a suspension for said pattern roll including a flexible element and a spring connected thereto and operating to exert pressure on said roll in the direction of said scratching roll, and means to adjust said flexible element to vary the tension of said spring.

8. In a machine for moiréing fabrics, scratching and pattern rolls between which a fabric is passed to produce moiré effects thereon, releasable means to support said scratching roll in cooperative relation with said pattern roll, and means to move said scratching roll away from the pattern roll upon release of the first named means.

9. In a machine for moiréing fabrics, scratching and pattern rolls between which a fabric is passed to produce moiré effects thereon, a treadle, a connection between said treadle and scratching roll for moving the latter into cooperative relation with said pattern roll when said treadle is actuated, means to releasably retain said treadle in actuated position, and means operable upon release of the treadle by the last-named means for moving said scratching roll away from said pattern roll.

10. In a machine for moiréing fabrics, scratching and pattern rolls between which a fabric is passed to produce moiré effects thereon, a resilient suspension for said pattern roll causing the same to exert pressure in the direction of said scratching roll, a treadle, a connection between said treadle and scratching roll for moving the latter into cooperative relation with said pattern roll when said treadle is actuated, means to releasably retain said treadle in actuated position, and spring means operable upon release of the treadle by the last-named means for moving said scratching roll away from said pattern roll.

11. In a machine for moiréing fabrics, feed and take-up rolls, means to produce moiré patterns in a fabric as it is fed from the feed to the take-up roll, a shaft for said feed roll, bearings in which said shaft is mounted, a support, a bearing bracket for one of said bearings slidable on said support, and a screw rotatable in said support and connected to said bracket for moving the same and said bearing to shift said feed roll and its shaft longitudinally of said pattern-producing means.

12. In a machine for moiréing fabrics, feed and take-up rolls, means to produce moiré patterns in a fabric as it is fed from the feed to the take-up roll, a shaft for said feed roll, bearings in which said shaft is mounted, a support, a bearing bracket for one of said bearings slidable on said support, and a screw rotatable in said support and connected to said bracket for moving the same and said bearing to shift said feed roll and its shaft longitudinally of said pattern-producing means, a shaft extending parallel to said feed roll, and connections between said shaft and screw for operating the latter.

13. In a machine for moiréing fabrics, scratching and pattern rolls between which a fabric is passed to produce moiré effects thereon, suspension means connected to each end of said pattern roll, a sectional shaft supporting said means, and means to alternatively rotate either or both sections of said shaft to adjust said pattern roll through said suspension means.

In testimony whereof, I have affixed my signature.

ALEXANDER MILHOMME.